(No Model.) 2 Sheets—Sheet 1.
A. HAMPE.
FRICTION CLUTCH.
No. 403,663. Patented May 21, 1889.
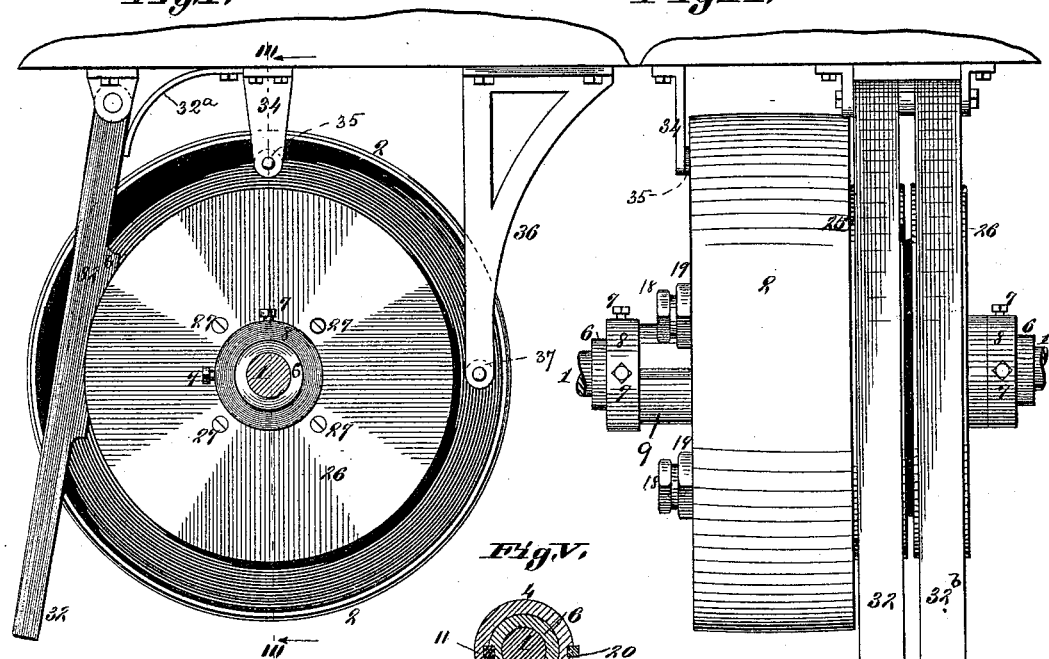
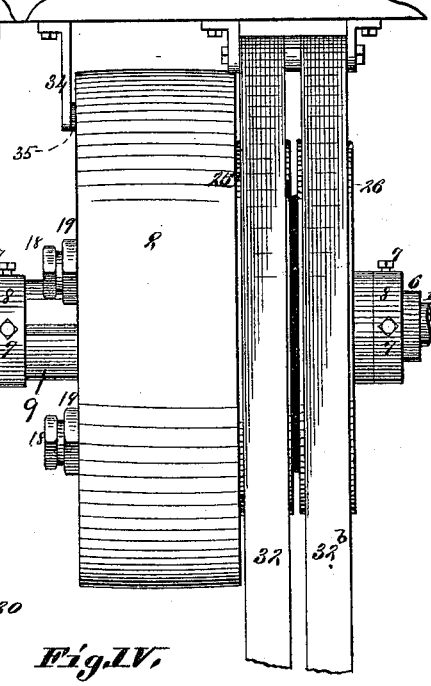
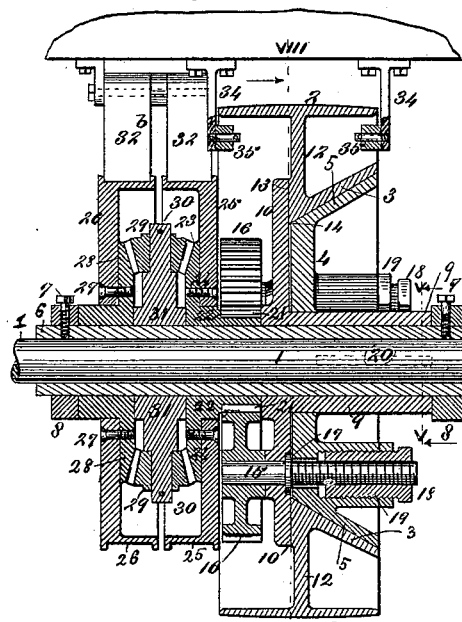
Attest
E. Arthur
Geo. E. Cruse
Inventor:
Albert Hampe
By Knight Bros
att'ys (No Model.) 2 Sheets—Sheet 2.
A. HAMPE.
FRICTION CLUTCH.
No. 403,663. Patented May 21, 1889.
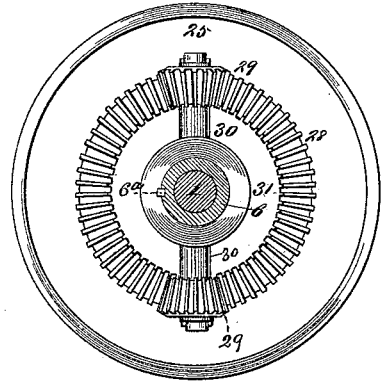
Fig. VI.
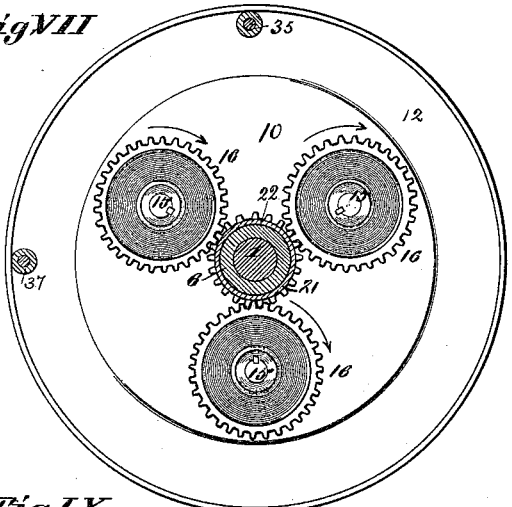
Fig. VII.
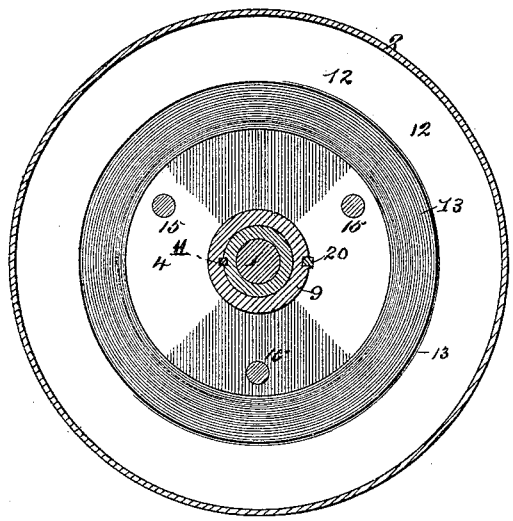
Fig. VIII.
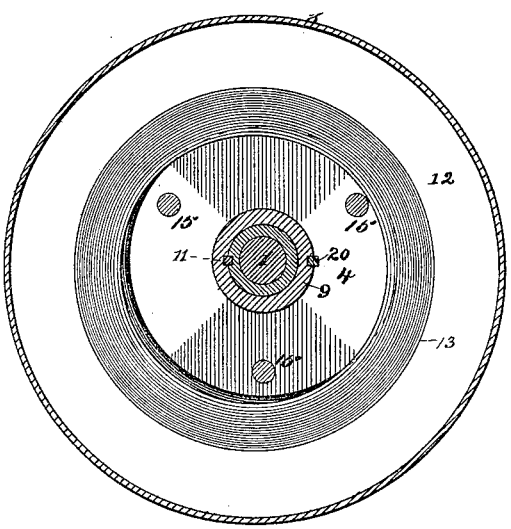
Fig. IX.
Attest:
E. Arthur
Geo. E. Cruse
Inventor:
Albert Hampe,
by Knight Bro'
attys

UNITED STATES PATENT OFFICE.

ALBERT HAMPE, OF ST. LOUIS, MISSOURI.

FRICTION-CLUTCH.

SPECIFICATION forming part of Letters Patent No. 403,663, dated May 21, 1889.

Application filed September 15, 1888. Serial No. 285,457. (No model.)

*To all whom it may concern:*

Be it known that I, ALBERT HAMPE, of the city of St. Louis, in the State of Missouri, have invented a certain new and useful Improvement in Friction-Clutches, of which the following is a full, clear, and exact description, reference being had to the accompanying drawings, forming part of this specification, and in which—

Figure I is a section transverse of a driving-shaft, showing my invention applied thereto. Fig. II is a front elevation. Fig. III is a section taken on the line III III, Fig. I, looking in the direction of the arrows. Fig. IV is a view part in section and part in elevation. Fig. V is a section taken on line V V, Fig. III, looking in the direction of the arrows. Fig. VI is a section taken on line VI VI, Fig. IV, looking in the direction of the arrows. Fig. VII is a similar view taken on the line VII VII, Fig. IV, looking in the direction of the arrows. Fig. VIII is a section taken on the line VIII VIII, Fig. III, looking in the direction of the arrows. Fig. IX is a section taken on the line IX IX, Fig. IV, looking in the direction of the arrows.

My invention relates to certain improvements in those friction-clutches which have outer and inner conical bearings adjusted in and out by means of screw-threaded rods and gearing.

My invention consists in features of novelty hereinafter fully described, and pointed out in the claims.

1 represents a driving-shaft, and 2 a pulley-rim driven thereby.

12 is an outer member of a clutch formed on the rim, having a conical bearing, 3. This outer member surrounds an inner member or truncated cone, 4, having a bearing, 5. On the shaft 1 is a sleeve, 6, which is made to revolve with the shaft by a set-screw connection, 7, the screw passing through collars 8. On the sleeve 6 is mounted a hub, 9, having a disk, 10. The hub has feather-and-groove connection 11 with the sleeve. The disk 10 bears against the projecting face 13 of the outer member, 12, the latter extending inward to a point, 14, which is the inner edge of the conical bearing 3.

Passing through the disk 10 are rods 15, on the inner ends of which are secured pinions 16, which prevent the rods from moving outwardly, and the rods are held from movement in the other direction by tight collars 17. (See Fig. III.) The outer ends of the rods are screw-threaded to receive nuts 18, fitting in sockets 19 of the inner member or truncated cone, 4, of the clutch. The inner member of the clutch slides on the hub 9 of the disk 10, but is made to turn therewith by a feather-and-groove connection, 20. (See Fig. V.)

It will be seen by turning the rods 15 in one direction that the inner member of the clutch will be moved away from the disk 10, as shown in Fig. IV, and this disconnects or relieves the friction between the inner and the outer members of the clutch, and the pulley-rim ceases to be driven. By turning the rods 15 in the other direction the inner member of the clutch will be thrown inward to the position shown in Fig. III, and a frictional bearing between the inner and the outer members of the clutch will be the result, and the pulley-rim will be driven. The rods 15 are thus turned by the pinions 16, which mesh with a central gear-wheel, 21, common to all, (see Figs. III and VII,) formed on the hub 22 of a bevel gear-wheel, 23. The wheel 23 is secured by a screw or pin, 24, to a friction-drum, 25.

26 represents another friction-drum, to which is secured by pins 27 a bevel gear-wheel, 28. The bevel-wheels 23 and 28 mesh with bevel-pinions 29 on a supporting-spindle, 30, which has a hub, 31, fitting on the sleeve 6 and keyed to the latter by a feather, $6^a$.

32 $32^b$ represent brakes, which may be of any suitable construction, and which respectively bear on the drums 25 and 26, and are sustained normally out of contact therewith by springs $32^a$. When the inner member of the clutch on the hub is to be moved out of engagement with the outer member of the clutch on the pulley-rim, pressure is applied to the brake $32^b$ of the drum 26, which causes the pinion 16 and rods 15 to turn in the direction that will move the inner member in an outwardly direction. When the inner member is to be brought into frictional contact with the outer member, pressure is applied to the brake 32 of the drum 25, which produces the reverse action on the inner member—that is, it draws it inwardly. When the inward member is in its outward or inoperative position, I prefer to support the pulley-rim 2 on hangers 34, as shown in Fig. IV. These hangers are preferably provided with friction-rollers 35. As the inner member moves outwardly, the pulley-rim drops onto these friction-rollers and is supported by them, (see Fig. IV,) and as the inner member moves inwardly the pulley-rim is lifted from the friction-rollers thereby.

Fig. VII also shows the pulley-rim resting upon the friction-rollers, and Fig. I shows it raised from the friction-rollers into operative position.

36 represents a hanger provided with a friction-roller, 37, (see Figs. I and VII,) which acts to prevent the lateral movement of the pulley-rim by the pressure of the belt, (not shown,) this hanger being placed upon the opposite side of the pulley-rim from the belt.

The connections between the driving-shaft and the pulley-rim are located within the latter.

Having thus described my invention, the following is what I claim as new therein and desire to secure by Letters Patent:

1. The combination, with a driving-shaft, of a hub mounted on the shaft having a disk, a pulley-rim having an outer conical bearing, an inner truncated cone-bearing, and screw-threaded rods having pinions and separably connecting one of the bearings with the disk, and the hub having central gear-wheel, substantially as described.

2. The combination, with a driving-shaft, of a hub mounted on the shaft having a disk, a pulley-rim having an outer conical bearing, an inner truncated cone-bearing, and screw-threaded rods having pinions and separably connecting one of the bearings with the disk, the hub having central gear-wheel, and gearing by which the gear-wheel hub is rotated, substantially as described.

3. The combination, with a driving-shaft, of a hub mounted on the shaft having a disk, a pulley-rim having an outer conical bearing, an inner truncated cone-bearing, and screw-threaded rods having pinions and separably connecting one of the bearings with the disks, the hub having central gear-wheel and bevel gear-wheel, and the friction-drum and its brake, substantially as described.

4. The combination, with a driving-shaft, of a hub mounted on the shaft having a disk, a pulley-rim having an outer conical bearing, an inner truncated cone-bearing, and screw-threaded rods having pinions and separably connecting one of the bearings with the disk, the hub having central gear-wheel and inner bevel gear-wheel, the inner friction-drum, the outer bevel gear-wheel, the outer friction-drum, the hub having a spindle, bevel-pinions on the spindle, and the brakes, substantially as described.

5. The combination, with a driving-shaft, of a hub, 9, mounted on the shaft, having a disk, 10, a pulley-rim, 2, having an outer conical bearing, 12 3, an inner truncated cone-bearing, 4 5, mounted on the disk-hub, and screw-threaded rods having pinions and separably connecting the cone-bearing with the disk, and the hub having the gear-wheel, substantially as described.

6. The combination, with a driving-shaft, of a pulley-rim, 2, having the outer member, 12, formed with conical bearing 3, the hub 9, having a disk, 10, the inner member, 4 5, mounted on the disk-hub, having sockets 18 and nuts 19, the screw-threaded rods 15, mounted in the disk, having pinions 16, the hub 22, having the gear-wheel 21, and mechanism for rotating the gear-wheel hub, substantially as described.

7. The combination, with a driving-shaft, of a pulley-rim having the outer member and the inner member of the friction-clutch within the rim, connecting the shaft with the rim, and hangers provided with friction-rollers for supporting the pulley-rim, substantially as described.

8. The combination, with a driving-shaft, of a pulley-rim, an outer conical bearing having the hub mounted on the shaft, having a disk, the inner truncated cone-bearing sliding on the hub, and the hangers provided with friction-rollers, substantially as described.

9. The combination, with a driving-shaft, of a pulley-rim having the outer conical bearing, the hub having a disk, the inner truncated cone-bearing, the screw-threaded rods having pinions, the gearing for rotating the pinions, and the hangers provided with friction-rollers for supporting the pulley-rim when not in use, substantially as described.

10. The combination of a shaft, 1, pulley-rim 2, having conical bearing 12 3, sleeve 6, hub 9, having a disk, 10, truncated cone-bearing 4 5, having sockets 18 and nuts 19, screw-threaded rods 15, having pinions 16, hub 22, having gear-wheel 21, bevel gear-wheels 24 and 28, spindle 30, having bevel-pinions 29, friction-drums 25 and 26, and brakes 32 and $32^b$, substantially as described.

ALBERT HAMPE.

In presence of—
   GEO. H. KNIGHT,
   EDW. S. KNIGHT.